United States Patent [19]
Santilli et al.

[11] Patent Number: 5,738,716
[45] Date of Patent: Apr. 14, 1998

[54] COLOR PIGMENTED INK JET INK SET

[75] Inventors: Domenic Santilli, Webster; Douglas Eugene Bugner, Rochester; Alexandra DeLauro Bermel, Spencerport; David Joseph Oldfield, Rochester, all of N.Y.

[73] Assignee: Eastman Kodak Company, Rochester, N.Y.

[21] Appl. No.: 699,877

[22] Filed: Aug. 20, 1996

[51] Int. Cl.⁶ ............................................ C09D 11/00
[52] U.S. Cl. ................ 106/31.77; 106/31.6; 106/31.85; 106/411; 106/412; 106/413
[58] Field of Search ........................ 106/31.6, 31.85, 106/411, 412, 413, 31.77

[56] References Cited

U.S. PATENT DOCUMENTS

| | | | |
|---|---|---|---|
| 4,311,775 | 1/1982 | Regan | 430/37 |
| 4,818,285 | 4/1989 | Causley et al. | 106/31.43 |
| 5,030,669 | 7/1991 | Hendrickson et al. | 106/412 |
| 5,143,547 | 9/1992 | Kappele | 106/31.51 |
| 5,145,519 | 9/1992 | Kappele | 106/31.51 |
| 5,185,034 | 2/1993 | Webb et al. | 106/31.43 |
| 5,273,573 | 12/1993 | Kappele | 106/31.51 |

*Primary Examiner*—Mark L. Bell
*Assistant Examiner*—Scott L. Hertzog
*Attorney, Agent, or Firm*—John R. Everett

[57] ABSTRACT

A color ink jet ink set for color printing is disclosed. The set comprises:

(a) a first ink comprises a carrier and a bridged aluminum phthalocyanine pigment as a cyan colorant;

(b) a second ink comprising a carrier and a quinacridone pigment as a magenta colorant; and (c) a third ink comprising a carrier and a non-benzidine yellow pigment.

A fourth ink comprising pigment black 7 may also be included in the set.

11 Claims, No Drawings

COLOR PIGMENTED INK JET INK SET

FIELD OF THE INVENTION

This invention relates to the field of ink jet printing, particularly color printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

U.S. Pat. No. 5,143,547 discloses a specific dye set comprising Acid Yellow 23, Direct Red 227, and Acid Blue 9 which "yields true, vivid colors on specially coated paper". U.S. Pat. No. 5,145,519 similarly discloses a specific dye set comprising Direct Yellow 86, Acid Red 52, and Acid Blue 9. U.S. Pat. No. 5,185,034 discloses a set of four dyes comprising the same cyan, magenta, and yellow dyes as U.S. Pat. No. 5,143,547 and Food Black 2. U.S. Pat. No. 5,273,573 discloses a specific dye set comprising Acid Yellow 23, Acid Red 52, and Acid Blue 9. The dye sets described above all suffer from a combination of poor waterfastness and poor lightfastness.

U.S. Pat. No. 4,818,285 discloses 4-color dye-based ink jet inks which exhibit a color gamut which closely matched a color video screen.

U.S. Pat. No. 4,311,775 discloses novel phthalocyanine pigments useful for electrophotography and photoelectrophoretic imaging. These pigments display a very good cyan hue and exhibit very good lightfastness. The use of these pigments in ink jet inks is not disclosed.

SUMMARY OF THE INVENTION

The present invention provides a color ink jet ink set for color printing; comprising (a) a first ink comprises a carrier and a bridged aluminum phthalocyanine pigment as a cyan colorant;

(b) a second ink comprising a carrier and a quinacridone pigment as a magenta colorant; and (c) a third ink comprising a carrier and a non-benzidine yellow pigment.

This color ink jet ink set provides color gamuts suitable for pictorial imaging and exceptional lightfastness. Pigment Black 7 can be added to further increased the available color gamuts of this ink set.

Pigments referred to by pigment numbers are numbers assigned by *Color Index*.

DETAILED DESCRIPTION OF THE INVENTION

In the context of the present invention, the choice of pigment is critical. The inks of the present invention are intended to be used in three- or four-color ink jet printers, e.g., printers which contain print cartridges capable of printing cyan, magenta, and yellow (CMY three-color printers), or cyan, magenta, yellow, and black (CMYK four-color printers). It is especially important to select a set of CMY or CMYK pigments which demonstrate excellent lightfastness and which yield as wide a color gamut as possible. In this regard the preferred black pigment is pigment black 7, also known as carbon black, and the preferred magenta pigment is a quinacridone pigment such as pigment red 122.

The choice yellow pigment is less straightforward. Preferred yellow pigments are the so-called non-benzidine yellows. This is because yellow pigments based on the benzidine chromophore have been shown to yield potentially toxic byproducts when they degrade. Of the non-benzidine yellow pigments, pigment yellow 138, pigment yellow 139, pigment yellow 180, pigment yellow 74, pigment yellow 185, pigment yellow 154 and mixtures thereof are preferred. Especially preferred is pigment yellow 74. Pigment numbers are as designated in the *Color Index*.

Although commercially available cyan pigments such as pigment blue 15 (copper phthalocyanine) are well-known for their excellent lightfastness, they tend to be more blue than cyan in hue, and thus the overall color gamut is limited when they are used in conjunction with the preferred magenta, yellow, and black pigments noted above. Hydroxyaluminum phthalocyanine exhibits a greener hue than copper phthalocyanine, but suffers from relatively poor lightfastness. One class of cyan pigments which display both excellent hue and lightfastness are the so-called bridged aluminum phthalocyanines as described in U.S. Pat. No. 4,311,775, incorporated herein by reference. These pigments are generically represented by the following formulas:

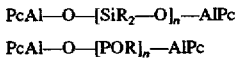

where Pc represents a substituted or unsubstituted phthalocyanine ring, R is an alkyl group, an aryl group, or an arakyl group, and n is an integer from 0 to 4. For a more complete description of these pigments, see U.S. Pat. No. 4,311,775. A useful siloxane-bridged aluminum phthalocyanine is bis (phthalocyanylalumino)tetraphenyldisiloxane (Pc is unsubstituted, R is phenyl, and n is 2). Mixtures of bis (phthalocyanylalumino)tetraphenyldisiloxane with either copper phthalocyanine, hydroxyaluminum phthalocyanine, or both may also be used provided that bis (phthalocyanylalumino)tetraphenyldisiloxane comprises at least 80 weight percent of the mixture.

A useful 3-color ink set comprises pigment red 122, pigment yellow 74, and bis(phthalocyanylalumino) tetraphenyldisiloxane.

A useful 4-color pigmented ink set comprises pigment black 7, pigment red 122, pigment yellow 74, and bis (phthalocyanylalumino)tetraphenyldisiloxane.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill and a bead mill. A high speed mill is particularly useful.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, π, and the impeller diameter. Sufficient milling media velocity is achieved, for example, in Cowles-type saw tooth impeller having a diameter of 40 mm when operated at 9,000 rpm. Useful proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration.

With either of the above modes the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of useful dispersants. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol monomethyl (or -ethyl) ether, propylene glycol monomethyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is useful as the aqueous carrier medium. In the case of a mixture of water and diethylene glycol, the aqueous carrier medium usually contains from about 30% water/70% diethylene glycol to about 95% water/5% diethylene glycol. Useful ratios are approximately 60% water/40% diethylene glycol to about 95% water/5% diethylene glycol. Percentages are based on the total weight of the aqueous carrier medium.

Block copolymers defined for this invention are added in a concentration of 0.2 to 5 weight percent as previously stated if not already included in the mill grind. Included are block copolymer of ethylene oxide and propylene oxide having a structure selected from the group consisting of:

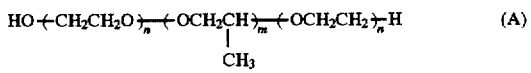

having a number average molecular weight of 4000 to 15,000 and the ratio of n/m of 5 to 10;

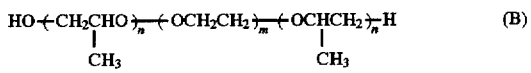

having a number average molecular weight of 4000 to 9000 and a ratio of n/m of 8 to 15.

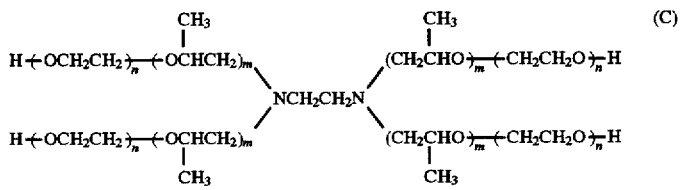

having a number average molecular weight of 5,000 to 40,000 and a ratio of n/m of 5 to 10; and

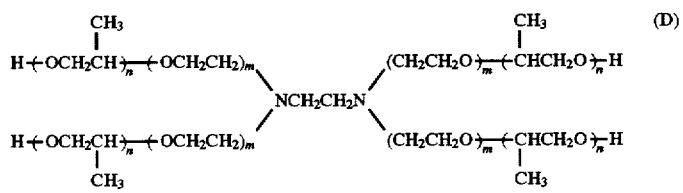

having a number average molecular weight of 8,000 to 20,000 and a ratio of n/m of 8 to 15. The structure may be either linear triblock (ABA or BAB) morphology in which A represents polyethylene oxide and B the polypropylene oxide. Useful block copolymers also include branched tetrafunctional type copolymers derived from the sequential addition of propylene oxide and ethylene oxide to ethylenediamine.

Solid block copolymers (A), (B), (C) and (D), having the defined molecular weights, and the blocks of polyethylene oxide and polypropylene oxide are commercially available from BASF Corporation under the name Pluronic® and Tetronic® surfactants. Block copolymer concentration in the inks is most useful from 0.2 to 5 weight percent, based on the total weight of the ink composition. Concentrations less than 0.2 weight percent. Concentration below 0.2 weight percent have no effects. At concentrations higher than 5% image quality deteriorates.

Examples of useful block copolymers, together with their respective Pluronic® trade designations, number average molecular weights, number of each block copolymer units and their relative ratios in the block copolymer are presented below. Examples of ABA block copolymers according to structure I are:

| Pluronic ® Designation | MW | Each n | m | n/m |
|---|---|---|---|---|
| F38 | 4k | 40 | 10 | 8 |
| F68 | 8k | 80 | 20 | 8 |
| F108 | 14K | 140 | 40 | 7 |

Examples of BAB block copolymers according to structure II are:

| Pluronic ® Designation | MW | Each n | m | n/m |
|---|---|---|---|---|
| 10R8 | 5K | 90 | 15 | 6 |
| 17R8 | 7K | 135 | 23 | 6 |
| 25R8 | 9K | 160 | 30 | 6 |

Branched block copolymers are available under the tradename TETRONIC from BASF Corporation. Tradename designations falling within the structures (C) and (D) are TETRONIC 707, 1107 and 1508.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments.

Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, pH adjusters, buffers, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks comprising the three- and four-color sets of pigments of the present invention can be used in any of the popular ink jet printing systems, including thermal or piezoelectric drop-on-demand printers and continuous ink jet printers. Of course, the specific ink formulations will vary depending upon the type of ink jet printing system.

The inks of the present invention are most advantageously used in conjunction with photographic quality ink jet paper, such as that manufactured and sold by the Eastman Kodak Company. This is because the optical density and color gamut are enhanced when the inks of the present invention are deposited on this type of paper. However, these inks will also be useful for printing on a variety of transparent and opaque films, and even on so-called plain papers.

The following examples further clarify the invention.

EXAMPLE 1

Pigment black 7 (Black Pearls 880 obtained from Cabot Corp.). The following ingredients were added to a 1-liter, water-cooled vessel:

| | |
|---|---|
| 300 g | of polymeric beads, mean diameter of 50 μm (milling media) |
| 200 g | de-ionized water (liquid carrier medium) |
| 16 g | of N-methyl-N-oleoyl taurate (OMT; dispersant) |
| 40 g | pigment black 7 |

The mixture was milled for 4 hr at 7000 rpm using a "Cowles"-type dispersing blade (40 mm diameter). The mill grind was then separated from the grinding media by passing it through a 15-μm filter. The mill grind was then diluted to a working strength ink with the following final composition:

25.6 weight percent mill grind (4 weight percent pigment)
5 weight percent diethylene glycol
5 weight percent glycerol
0.3 weight percent Pluronic F-68
de-ionized water to 100 weight percent The resulting ink was filtered through a 3-μm filter, and the filtrate was introduced into an ink jet printhead suitable for use in a Hewlett-Packard DeskJet® 540C ink jet printer. Test images comprising patches of varying densities or percentage coverages of the ink, including 100% coverage (Dmax) were printed on a glossy ink jet paper sold by Eastman Kodak Co. as "Heavy Weight Photographic Quality Inkjet Paper". These images were used to measure lightfastness, reflectance spectra, and densitometry.

Lightfastness was measured by comparing the optical density of the Dmax patch before and after treatment with a high intensity (50 Klux) xenon lamp, filtered with a piece of window glass to simulate sunlight coming through an office window. One day of exposure under these conditions is approximately equivalent to one year under ambient conditions. After 7 days of treatment, there was essentially no loss in optical density.

EXAMPLE 2

Pigment red 122 (Sunfast Quinacridone Pigment obtained from Sun Chemical Corporation). A pigmented magenta ink jet ink was prepared and characterized in the same manner as that described in Example 1. This ink exhibited a 7% loss in density after 7 days of exposure to 50 Klux filtered light.

EXAMPLE 3

Pigment yellow 180 (Toner Yellow HGVP 2155 obtained from Hoechst Celanese Corp.). A pigmented yellow ink jet ink was prepared and characterized in the same manner as that described in Example 1. This ink exhibited a 24% loss in density after 7 days of exposure to 50 Klux filtered light.

EXAMPLE 4

Pigment yellow 139 (Paliotol Yellow K1841 obtained from BASF Corp.). A pigmented yellow ink jet ink was prepared and characterized in the same manner as that described in Example 1.

EXAMPLE 5

Pigment yellow 74 (11-2510 Hansa Brilliant Yellow 5GX obtained from Hoechst Chemical Co.). A pigmented yellow ink jet ink was prepared and characterized in the same manner as that described in Example 1. This ink exhibited a 4% loss in density after 7 days of exposure to 50 Klux filtered light.

EXAMPLE 6

Pigment yellow 138.(Paliotol Yellow L 0962 obtained from BASF Corp.). A pigmented yellow ink jet ink was prepared and characterized in the same manner as that described in Example 1.

EXAMPLES 7–9

Pigment yellow 74/pigment yellow 139 mixtures. Pigmented yellow ink jet inks comprising the following mixtures of pigment yellow 74 and pigment yellow 139 were prepared and characterized in the same manner as that described in Example 1.

| Example 7: | 1:1 | p.y. | 74/p.y. | 139 |
| Example 8: | 2:3 | p.y. | 74/p.y. | 139 |
| Example 9: | 3:2 | p.y. | 74/p.y. | 139 |

EXAMPLES 10–12

Pigment yellow 180/pigment yellow 139 mixtures. Pigmented yellow ink jet inks comprising the following mixtures of pigment yellow 180 and pigment yellow 139 were prepared and characterized in the same manner as that described in Example 1.

| Example 10: | 1:1 | p.y. | 180/p.y. | 139 |
| Example 11: | 2:3 | p.y. | 180/p.y. | 139 |
| Example 12: | 3:2 | p.y. | 180/p.y. | 139 |

EXAMPLE 13

Bridged aluminum phthalocyanine (bis(phthalocyanylalumino)tetraphenyldisiloxane) obtained from the Synthetic Chemicals Division of Eastman Kodak Co.). A pigmented cyan ink jet ink was prepared and characterized in the same manner as that described in Example 1. This ink exhibited essentially no loss in density after 7 days of exposure to 50 Klux filtered light.

COMPARATIVE EXAMPLE 14

A prior art color ink jet set consisting of the inks used in the Hewlett-Packard DeskJet 755CM ink jet printer was evaluated for comparative purposes. This ink set comprises a pigmented black (pigment black 7) ink, and cyan, magenta, and yellow dye-based inks. These inks were printed on a glossy photographic ink jet paper manufactured by Eastman Kodak Co. These inks exhibit the following percent fade in optical density when exposed under the same condition as that described in Example 1: black: 2%, cyan: 15%, magenta: 20%, yellow: 39%. The color gamut of this ink set is included in the Table of Example 16.

COMPARATIVE EXAMPLE 15

The lightfastness and color gamut of a silver halide based imaging system was evaluated for comparative purposes. Test images were printed on Ektacolor® Edge II paper and were evaluated for lightfastness and color gamut. The cyan, magenta, and yellow dyes produced by this system exhibit the following percent fade in optical density when exposed under the same condition as that described in Example 1: cyan: 9%, magenta: 12%, yellow: 19%. The color gamut of this color set is included in the Table of Example 16.

EXAMPLE 16

Color gamuts. Theoretical color gamuts were calculated by the following procedure. The results are set forth in the following Table. In general, the larger the gamut, the more possible colors that a given ink set can reproduce.

All density values are based on integral spectral reflectance measurements made on a MacBeth 2145 Spectrophotometer. A Xenon pulsed source was used with a 10 mm nominal aperture. Reflectance measurements were made over 380 to 750 nanometer wavelength range in intervals of 10 nanometers. The geometry employed was 45/0.

The calculation of gamut was determined by using the actual optical densities at Dmax of each of the inks in each ink set. Characteristic vector analysis was used to construct a characteristic absorption curve over the range of the visible spectrum (380–750 nm) for each of the inks. The characteristic vector for each ink is a two-dimensional array of optical density vs. wavelength. This technique is described by A. J. Sant in *Photographic Science and Engineering*, 5(3), May–June, 1961, and by J. L. Simonds in the *Journal of the Optical Society of America*, 53(8), 968–974 (1963). The characteristic vectors were used to define the relationship of the ink hues and the combinations thereof used in the calculation of the color gamuts for the various ink sets listed in the following table.

For the purpose of this invention, color gamut is specified using the conventional metric generally associated with reflection prints, which is CIELAB. The 1931 CIE 2 standard observer color matching functions as well as the CIE defined illuminant D5000 were used. This information and the characteristic vectors described above were used to calculate the color gamut at a particular L* value for each set of inks, using the method described in the *Journal of Photographic Science*, 38, 163 (1990). Note that for this calculation no light scatter is assumed. The color gamut values cited in the following table represent the sum of the a* vs. b* areas at nine different L* slices (10, 20, 30, 40, 50, 60, 70, 80, and 90) calculated for each ink set. The areas at each L* slice were determined using a trapezoidal rule summation along the b* axis.

It can be seen that the inks of the present invention provide color ink sets which exhibit both excellent lightfastness and color gamuts suitable for pictorial imaging.

| Color Set | 4 Color Gamut Volume | 3 Color Gamut Volume |
| --- | --- | --- |
| Examples 1, 2, 3, 13 (PY 180) | 53,436 | 46,533 |
| Examples 1, 2, 4, 13 (PY 139) | 60,224 | 55,663 |
| Examples 1, 2, 5, 13 (PY 74) | 66,176 | 61,217 |
| Examples 1, 2, 6, 13 (PY 138) | 56,307 | 49,540 |
| Examples 1, 2, 7, 13 (1:1 PY 74/139) | 57,968 | 52,386 |
| Examples 1, 2, 8, 13 (2:3 PY 74/139) | 61,820 | 56,827 |
| Examples 1, 2, 9, 13 (3:2 PY 74/139) | 52,870 | 46,345 |
| Examples 1, 2, 10, 13 (1:1 PY 180/139) | 60,806 | 55,804 |
| Examples 1, 2, 11, 13 (2:3 PY 180/139) | 58,926 | 53,691 |
| Examples 1, 2, 12, 13 (3:2 PY 180/139) | 59,647 | 54,186 |
| Comp. Example 14 (HP 755CM) | 45,792 | 37,886 |
| Comp. Example 15 (Ektacolor Edge II) | | 56,105 |

The invention has been described in detail with particular reference to useful embodiments thereof, but it will be understood that variations and modifications can be effected within the spirit and scope of the invention.

We claim:

1. A color ink jet ink set for color printing; comprising
   (a) a first ink comprises a carrier and a bridged aluminum phthalocyanine pigment as a cyan colorant;
   (b) a second ink comprising a carrier and a quinacridone pigment as a magenta colorant; and
   (c) a third ink comprising a carrier and a non-benzidine yellow pigment.

2. The ink jet set of claim 1 wherein the yellow pigment is selected from the group consisting of pigment yellows 74, 138, 139, 154, 185, 180 and mixtures thereof.

3. The ink set of claim 1 further comprising pigment black 7 as a fourth ink.

4. The ink jet ink set according to claim 1 or 3 wherein the cyan pigment is bis(phthalocyanylalumino)tetraphenyldisiloxane.

5. The ink jet ink set according to claim 1 or 3 where the magenta pigment is pigment red 122.

6. The ink jet ink set according to claim 1 or 3 wherein the yellow colorant is pigment yellow 74.

7. The ink jet ink set according to claim 1 or 3 wherein the cyan colorant is a mixture of bis(phthalocyanylalumino)tetraphenyldisiloxane with either (a) copper phthalocyanine, or (b) hydroxyaluminum phthalocyanine or (c) both copper phthalocyanine and hydroxyaluminum phthalocyanine provided bis(phthalocyanylalumino)tetraphenyldisiloxane comprises at least 80 weight percent of the mixture.

8. An ink jet ink set comprising
   (a) a first ink comprising bis(phthalocyanylalumino)tetraphenyldisiloxane as the cyan colorant;
   (b) a second ink comprising pigment red 122 as the magenta colorant;
   (c) a third ink comprising pigment yellow 74 as the yellow colorant.

9. The ink jet ink of claim 8 further comprising pigment black 7.

10. The ink jet ink set of claims 1, 2, 3, 8 or 9 wherein each ink contains 0.1 to 10.0 weight percent of total pigment and the carrier is selected from water and water miscible organic solvents.

11. An ink jet printing method for printing color images, comprising the steps of:

providing an ink jet printer that is responsive to digital data signals;

loading the printer with ink receptive substrates;

loading the printer with a three color ink jet ink set according to claim 1; and printing on the ink receptive substrates in response to the digital data signals.

* * * * *